US007818205B2

(12) United States Patent
Clark et al.

(10) Patent No.: US 7,818,205 B2
(45) Date of Patent: Oct. 19, 2010

(54) SEARCH ENGINE PROVIDING AN OPTION TO WIN THE ITEM SOUGHT

(75) Inventors: Scott Clark, New York, NY (US); Armen Djourian, New York, NY (US); Moujan Vahdat, New York, NY (US)

(73) Assignee: Pickapin.com, Bronx, NY (US)

( * ) Notice: Subject to any disclaimer, the term of this patent is extended or adjusted under 35 U.S.C. 154(b) by 868 days.

(21) Appl. No.: 09/759,103

(22) Filed: Jan. 12, 2001

(65) Prior Publication Data
US 2002/0138342 A1 Sep. 26, 2002

(51) Int. Cl.
G06Q 30/00 (2006.01)
(52) U.S. Cl. ..................................... 705/14.1
(58) Field of Classification Search ................... 705/14, 705/14.1, 26; 463/1, 42
See application file for complete search history.

(56) References Cited

U.S. PATENT DOCUMENTS

| 5,933,811 | A  | * | 8/1999  | Angles et al.    | 705/14  |
| 6,183,366 | B1 | * | 2/2001  | Goldberg et al.  | 463/42  |
| 6,331,143 | B1 | * | 12/2001 | Yoseloff         | 463/18  |
| 6,364,765 | B1 | * | 4/2002  | Walker et al.    | 463/16  |
| 6,443,843 | B1 | * | 9/2002  | Walker et al.    | 463/42  |
| 6,553,178 | B2 | * | 4/2003  | Abecassis        | 386/83  |
| 2002/0016779 | A1 | * | 2/2002 | Roll et al.      | 705/400 |
| 2002/0082978 | A1 | * | 6/2002 | Ghouri et al.    | 705/37  |
| 2003/0054888 | A1 | * | 3/2003 | Walker et al.    | 463/42  |

FOREIGN PATENT DOCUMENTS

WO    WO 00/38086    *    6/2000

OTHER PUBLICATIONS

Bredemeier, Kenneth, Internet Sites Deliver Prized Customers, Washington Post, Jan 21, 2000.*
bottomdollar.com, Oct. 13, 1999 (http://www.web.archive.org/web/19991013040730/http://bottomdollar.com/index.html).*
CNET Networks Media Property, undated (visited Aug. 24, 2001), url address http://www.mysimon.com/.
Network Commerce Inc., undated (visited Aug. 21, 2001), url address http://www.shopnow.com/.
Network Commerce Inc., undated (visited Aug. 24, 2001), url address http://www.bottomdollar.com/.
Dealtime, Compare Products, Prices & Stores, undated (visited Aug. 24, 2001) url address http://www.dealtime.com/.

(Continued)

Primary Examiner—Daniel Lastra
(74) Attorney, Agent, or Firm—Ward & Olivo

(57) ABSTRACT

A computer-implemented method including receiving a search request for a product; processing the search request with a processing device; generating a message containing information regarding at least one product offered by a retail vendor; transmitting the message; automatically providing the user with an option to play a game to win a selected product from the product information without the user first making any payment or requesting the option; electronically calculating a dynamic probability of winning the selected product by the user based on one or more factors; electronically and randomly generating a trial outcome for a game of chance; generating an outcome indicator; displaying the outcome indicator to the user; and in response to a winning trial outcome, purchasing the selected product for the user from the independent third-party retail vendor at no cost to the user.

35 Claims, 13 Drawing Sheets

OTHER PUBLICATIONS

Anaconda Products, undated (visited Aug. 24, 2001), url address http://www.anaconda.net/.

iWon, undated (visited Aug. 24, 2001), url address http://www.home.iwon.com/.

iwin, undated (visited Aug. 24, 2001, url address http://www.iwin.com/.

FreeLotto, undated (visited Aug. 24, 2001, url address http://www.freelotto.com/.

LuckySurf.com, Inc., undated (visited Aug. 24, 2001, url address http://www.Luckysurf.com/.

Treeloot, undated (visited Aug. 24, 2001, url address http://www.treeloot.com/.

BigPrizes, undated (visited Aug 24, 2001, url address http://www.biqprizescom/.

Win.com, undated (visited Aug 24, 2001, url address http://www.win.com/.

WinDay.com Inc., undated (visited Aug 24, 2001, url address http://www.prod.shelron.com/winday.>.

* cited by examiner

Pickapin.com

Advertisement ~301

Whatever you want to buy on the Internet can now be won.

HOME | Find Great Products from great websites
ANY | Find it

| PRIZE / PRODUCT: > Leann Rimes | | | Your Lucky Pin |
|---|---|---|---|
| Do You Want Better Odds Of Winning? Get Help From Our Sponsor >>> Visit this web site and we'll lock in a number > | Sponsor message | | 0 8 4 5 6 1 |

Try to Win it before you Buy it. [ ]   ~9102   Change my pin   CDNOW

Demo Play 1 2

| Category: | Music | Merchant: | CDnow.com |
|---|---|---|---|
| Price: | $5.00 | Profile: | Click Here |
| Description: | Click Here | Buy it: | Click Here |

Good Luck and Happy Shopping

Advertisement

About Us | How It Works | Rules | Ad Your Site | Advertise
Privacy | Contact Us | Winners | Product Alerts Copyright 1999 Celltalk, Inc.

Fig. 10

Fig. 11

SEARCH ENGINE PROVIDING AN OPTION TO WIN THE ITEM SOUGHT

BACKGROUND

Shopping search engines accept descriptions of a desired product or service that a user wishes to purchase, and return indications of dealers in the product or service. The user may then purchase the product or service from a dealer indicated by the search engine. The most common such shopping search engines are price comparison search engines such as mysimon.com, which return indications of dealers together with a associated prices. Such shopping search engines lack the excitement provided by games of chance. Other shopping search engines include shopnow.com, bottomdollar.com, dealtime.com, and anaconda.net.

Conversely, games of chance do not permit the user to search for the prize to be won. The range of prizes to be won in any particular game of chance have generally been small, and determined by the sponsor of the game. Typically only a single prize or a fixed range of prizes may be won. Such sites include Iwon.com, Iwin.com, Freelotto.com, Luckysurf.com and Treeloot.com. Viewing advertisements typically is a prerequisite of play, and may increase a user's chance of winning at these sites.

Some sites allow users to win or buy one of a small number of predetermined prizes. Such sites include Bigprizes.com and Winday.com. None of these sites permit a user to search for an arbitrary item or service and attempt to win the item or service.

SUMMARY

In one aspect, the system of the present invention enhances shopping search engines and games of chance by permitting the user to search for and locate the prize the user seeks to win or buy, and then playing a game of chance to win the specified item, or going to the web site to buy.

In another aspect, the system of the present invention adjusts the probability of a user's winning a game of chance in accordance with the revenue that the system has received from the user.

In one preferred embodiment, the invention comprises a method of providing a game of chance comprising the steps of: receiving electronic signals representing search parameters descriptive of a product or service; transmitting electronic signals representing dealers in the product or service and associated prices; electronically calculating a probability of winning the product or service if the user selects to play the game; electronically generating a pseudo-random outcome having a probability corresponding to the calculated probability; based on the pseudo-random outcome, purchasing the product or service for a user.

In another preferred embodiment, the invention further comprises calculating the probability so as to increase with the value of derived from the user's interaction with the system.

In another preferred embodiment, the invention further comprises indicating the outcome by displaying a user-chosen number and a comparison number, such that a winning outcome is indicated by displaying a comparison number that matches the user-chosen number, and a losing outcome is indicated by displaying a comparison number that does not match the user-chosen number.

In another preferred embodiment, an increased probability of winning is indicated by displaying a comparison number having at least one digit matching the corresponding at least one digit of the user-selected number.

In still another preferred embodiment, the probability of winning is different than one divided by ten raised to the power of the number of digits in the comparison number.

DESCRIPTION OF THE DRAWINGS

FIG. 10 illustrates an example display of an example preferred embodiment.

FIG. 11 illustrates an example display of an example preferred embodiment.

DETAILED DESCRIPTION

Comparison Shopping Module

Figure 1:
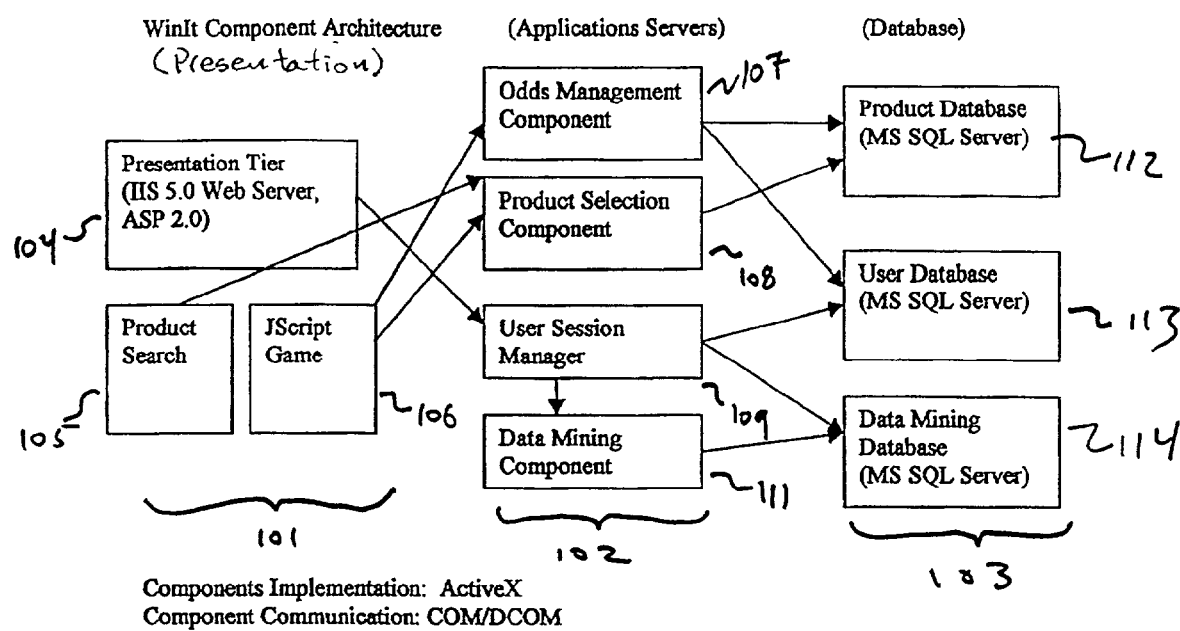
FIG. 1 schematically illustrates the architecture of an example preferred embodiment.

FIG. 1 depicts the system architecture for an example preferred embodiment of a system implementing the present invention. The system shown in FIG. 1 retrieves item or service and price information from third-party web sites offering items for sale and allows the user to search for the lowest prices for an item or service. After locating an item or service of interest, the user may purchase the item or service or attempt to win the item or service via the game aspect of the system described below in connection with system user displays.

The system comprises three tiers—a presentation tier 101, an application tier 102, and a database tier 103. The presentation tier comprises the Microsoft IIS 5.0 Web Server with ASP 2.0, along with mobile logic that is transmitted to the browser of a user, including product search logic 105 and Jscript and Java game logic 106. The Web server and mobile logic interact with the applications tier as indicated in FIG. 1. The applications tier comprises an odds management component 107, a product selection component 108, a user session manager 109, and a data mining component 111. The applications tier interacts with the presentation tier 101 and the database tier 103. The database tier 103 comprises a product database 112, a user database 113, and a data mining database 114.

Application tier components are Microsoft ActiveX components, preferably written in C++ in conformance with the COM/DCOM distributed object model. The odds management component 107 performs odds calculations and random trials for game play as described more fully below. The product selection component 108 retrieves product information from the product database for presentation to the user when searching for, attempting to win, or purchasing products available through the system. The user session manager 109 maintains state information across HTTP requests, allowing user sessions to be tracked. The data mining component 111 gathers product information from third-party websites for use in the system as described below.

The database layer is preferably implemented in Microsoft SQL Server. The product database 112 stores product information gathered by the data mining database 114. The user database 113 stores user profiles, user names, and passwords. The data mining database 113 stores product information gathered by the data mining component 111 from third-party databases. Product information from the data mining database 114 is periodically copied into the product database 112.

The system shown in FIG. 1 is preferably deployed in a distributed environment, comprising a Web server computer and a database server computer. The Web server computer preferably comprises an Intel Pentium 3 computer connected via ethernet to an Internet-connected router. The Web server computer preferably runs Microsoft Windows Server 2000 and Microsoft IIS 5.0 Web Server with ASP 2.0. The database server computer preferably comprises an Intel Pentium 3 computer on the same ethernet network as the Web server, running Microsoft Windows Server 2000 and Microsoft SQL Server v 7.0.

Figure 3:
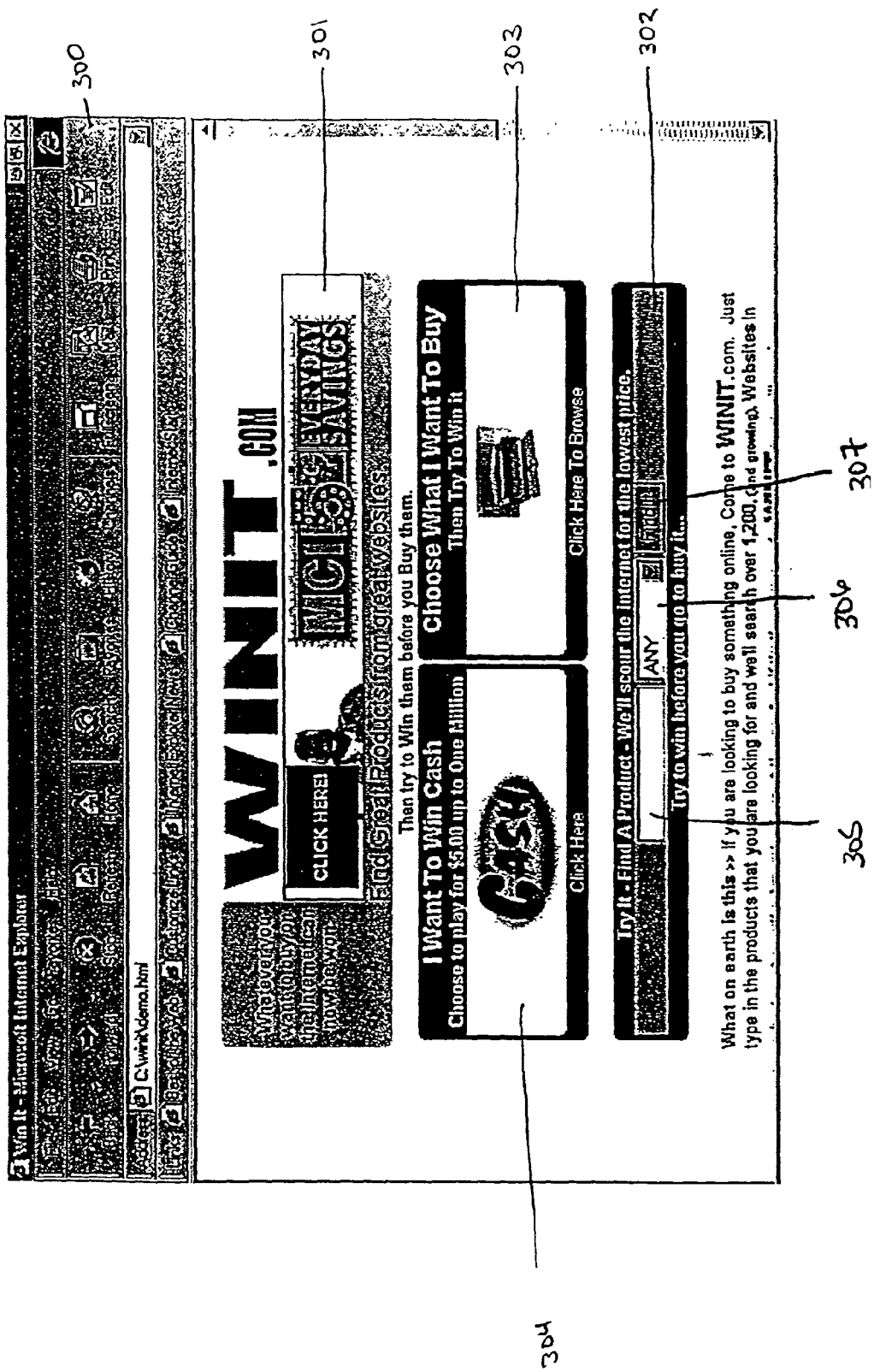
FIG. 3 illustrates an example display of an example preferred embodiment.

FIG. 3 depicts a preferred home web-page of the present invention. The advertising banner 301 displays advertisements of third-parties on a rotating basis either each time the front-end web-page is refreshed by the user or on a pre-determined time interval. Each of the web-pages generated by the system during a user's session displays an advertising banner 301, for which advertisers are charged.

Figure 2A:
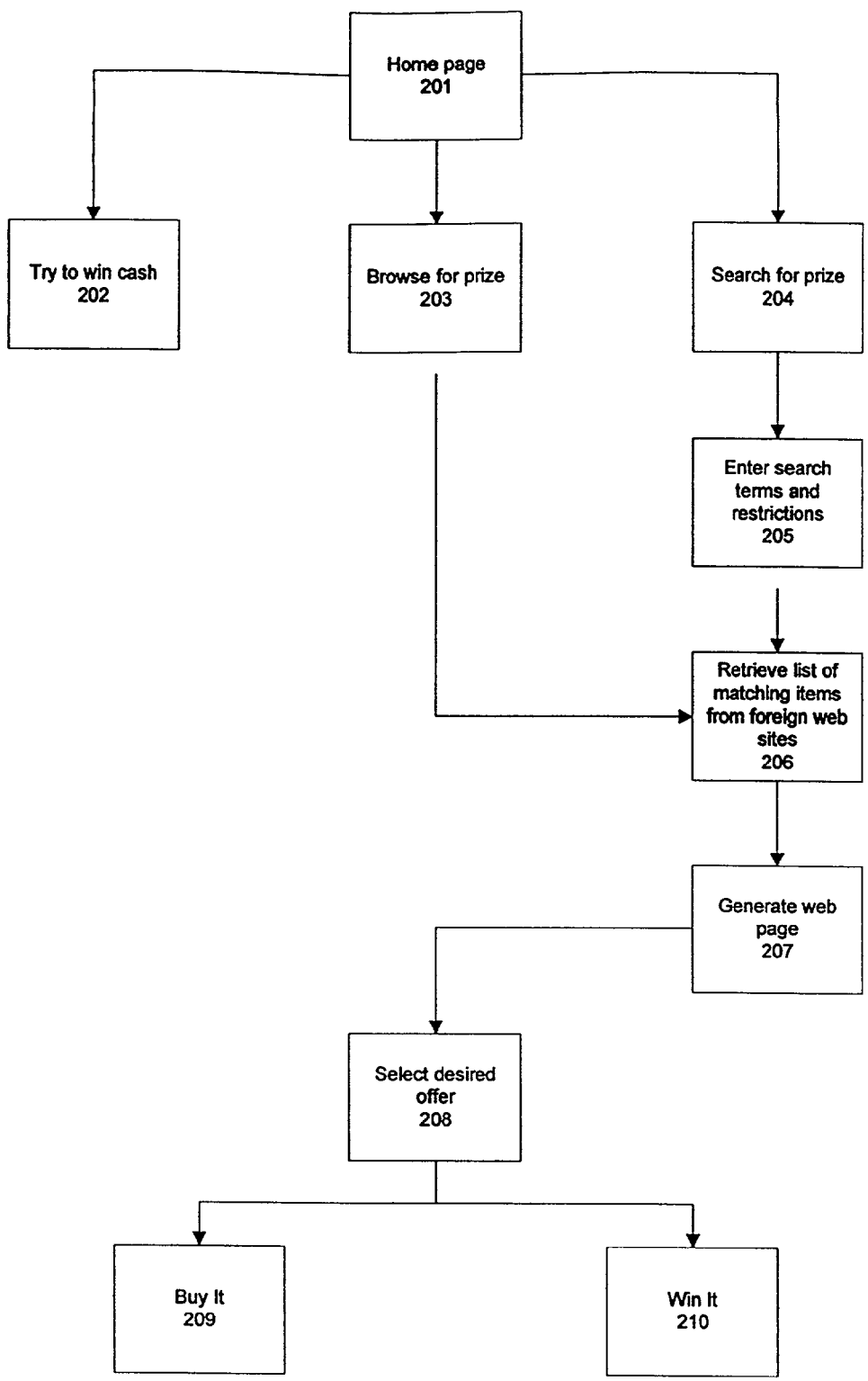
FIG. 2a is a flow chart that schematically illustrates the use of an example preferred embodiment.
Figure 2B:
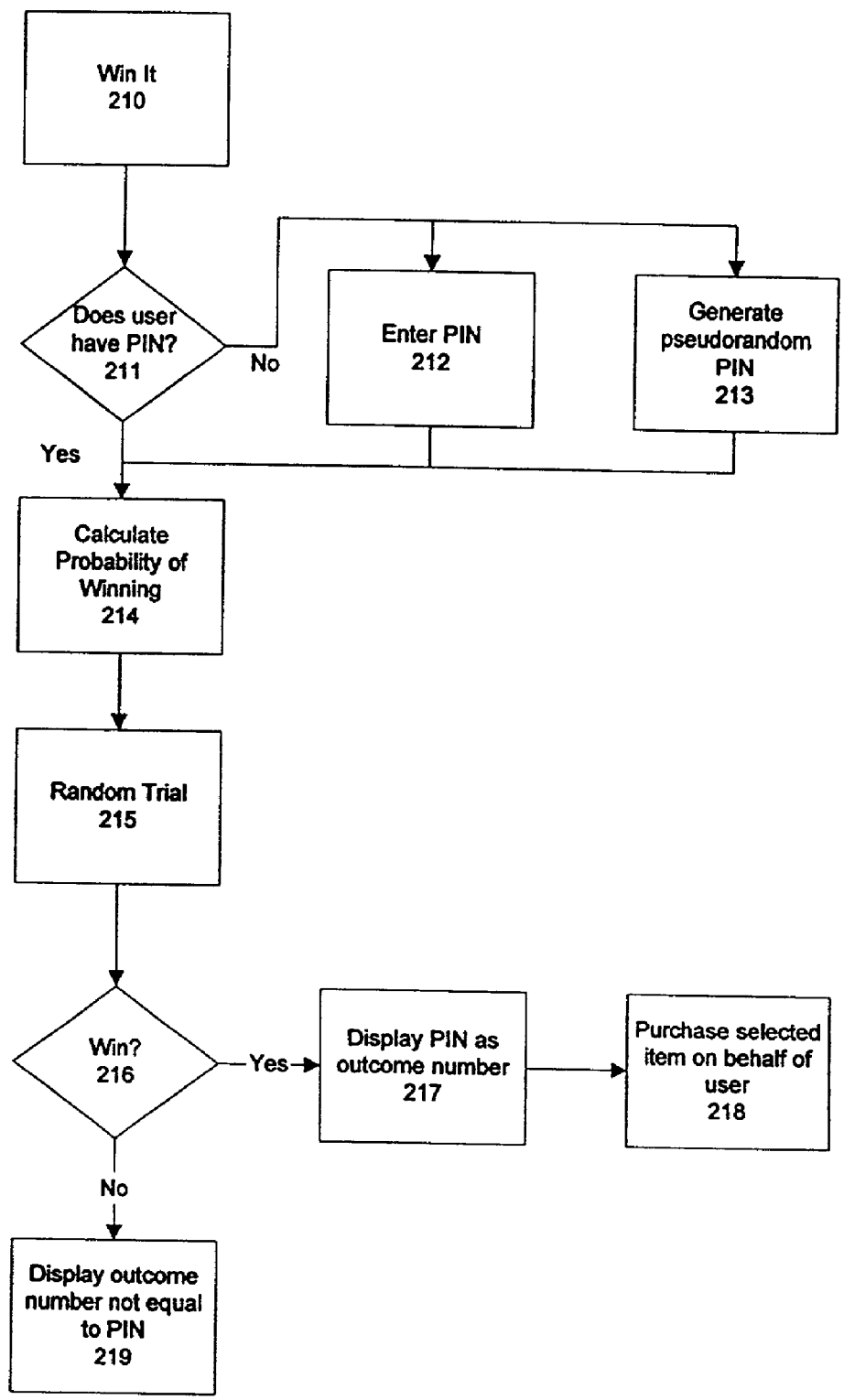
FIG. 2b is a flow chart that schematically illustrates the use of an example preferred embodiment.

The use of the system is schematically illustrated in FIGS. 2a and 2b. To begin, the user navigates to the home Web page for the system 201. From the home page, the user may attempt to win cash 202, browse for an item or service to attempt to win 203, or search for an item or service to attempt to win 204 using a search engine interface. After the user locates an item by browsing 203 or searching with search terms and restrictions 204, 205, the system retrieves a list of matching items or services available for sale on third-party Web sites along with pricing and other information 206 and displays the information to the user in a dynamically generated Web page 207. The user may then select the particular offer they desire 208 and either buy the offered item or service from the offering Web site 209 or attempt to win it using the game aspect of the invention 210.

If the user attempts to win the offered item or service 210, the system determines whether the user has an existing PIN number 211 for use in signifying the outcome of a game of chance. If not, the user may select a PIN by entering a number 212, or having a pseudo-random PIN generated for the user 213. When the user has a PIN, the system calculates a probability of winning the selected item or service based on factors including the items cost, the current prize budget available, and the revenues derived from this user 214. The system then generates a random trial having the calculated probability of occurrence 215. If the trial results in a win for the user, the system displays the user's PIN as an outcome number 217 and causes the selected item to be purchased for the user 218. If the trial does not result in a win for the user, an outcome number not equal to the user's PIN is displayed 219. Thus, in the foregoing description, the user is allowed to play the game and win the product without first making any payment.

From the home Web page depicted in FIG. 3, the user may click on the browse-for-prize hyperlink 303, the win-cash hyperlink 304 or may enter information in the search engine interface 302. At any time during the user's session in the preferred embodiment, the user may select and search for a new product or service by using the product search engine interface 302.

To use the product search engine interface 302, the user queries the search engine by entering a description of a desired product or service in the text box 302. In addition, the user may select search restrictions by clicking on the restriction list 306. For example, the user might search only electronics or games. Once the product or service title is entered in text box 305, the restrictions (if any) have been selected from the restriction list 306, the user may search for the item by clicking on the "Find It" button 307. The "Find It" button 307 comprises a portion of the product search logic 105 of the presentation layer 101, and causes a request to be transmitted to the product selection component 108, which in turn queries the product database 112. In response, the product database is searched for items meeting the search criteria entered 160.

The search engine searches the product database 112 for a set of third-party web sites 100 that sell the desired product or service, along with the price for the product or service and preferably other helpful information such as a picture of the product, a description of the service, product specifications, and availability and shipping options.

In a preferred embodiment, the search engine looks up the product or service in an indexed table of a selected third-party web sites 100 that have been previously indexed. Preferably, the selected third-party web sites 100 comprise only the websites of businesses that have relationships with the proprietors of the system, for which the selected third-party web sites are charged.

The index of third-party web sites may be generated with a spider or web crawler program or service such as the services available from Inktomi or Excite, or the WebL or Harvest programs. In the alternative, such programs can be custom designed and written by those skilled in the art, as described in "Programming Bots, Spiders, and Intelligent Agents in Microsoft Visual C++" by David Pallmann. Alternatively, the search engine may pass the description to search engines on selected sites 100 and retrieve and consolidate the results. A program such as WebL may be used for this purpose. In a preferred embodiment, the index is generated by replicating item databases from the select third-party web sites, via data transmission of database files, which are translated into a standard format by the data mining 102 component and stored in the product database 112.

Using the data retrieved from the product database 112 in response to the user's query, the product selection component 108 dynamically generates 180 a price comparison Web page that presents the price and other data in a format that allows the user to compare the offers made by the third-party web sites 100. Each third-party web site is preferably presented as a separate entry in a table on the web page, the entry comprising a description of the web site, item or service and price, along with a hyperlink to a page for purchasing the item or service. In a preferred embodiment of the invention, the system also displays review or rating information about the product, service or third-party web site 100 itself. This review or rating information may be generated by prior users of the system or may be incorporated from third-parties such as Consumer Reports or gomez.com.

The user may click on the user's choice of hyperlink that corresponds to a desired offer 210. The system presents a web page that displays the desired product or service and provides the user with the option of purchasing the desired product or service and the option of participating in the game aspect of the present invention in an attempt to win the desired product or service.

Figure 4:
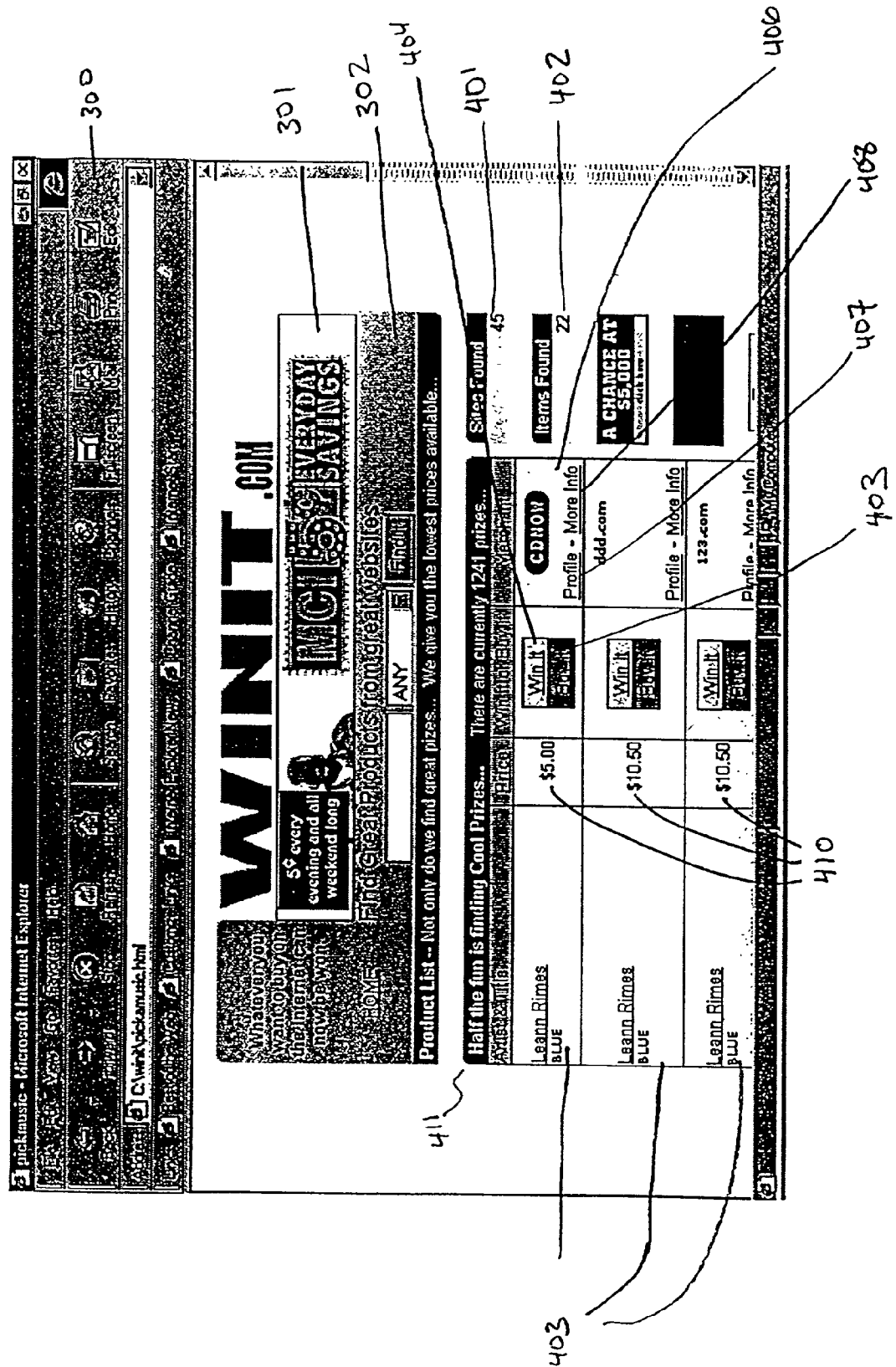
FIG. 4 illustrates an example display of an example preferred embodiment.

FIG. 4 depicts an example preferred dynamically generated price comparison Web page. The number of different sites found which offer the desired product or service is displayed in the "Sites Found" box 401. The number of different items found by the search engine is displayed in the "Items Found" box 402. This information is displayed so that the user can judge the effectiveness of the search, allowing the user to adjust the text or restrictions of the user's search using the search engine interface 302. Each third-party web site 100 that offers the desired product or service and which has been located by the search engine is displayed as a row in the table 411.

In the preferred embodiment, each row in the table 411 includes a hyperlink to the offer 403, the associated price 410, an indicator of the offeror 406 with associated profile 407 and "more info" 408 links, and "Win It" 404 and "Buy It" links. The offer hyperlinks 403 are arranged such that offer with the lowest price is displayed on the top row. When the user selects the "Buy-It" hyperlink 405, the product selection component 108 causes the user's browser to retrieve the appropriate page for purchasing the item on the third-party web-site 100 of the users choice. By clicking on the "Win It" hyperlink 404, the user's browser is caused to retrieve a page that displays the game aspect of the present invention discussed in greater detail below. Additional information regarding the product or the merchant can be obtained by clicking on the "Profile" hyperlink 407 or the "More Info" hyperlink 408.

URL-based Embodiment

According to another aspect of the present invention, the user can access the system in the manner described above, but instead of entering a desired a product or service into the search engine interface, the user can locate a product by entering a particular web-site or URL address into the system. The system then acquires the price and other helpful data and gives the user the option of purchasing the desired product or service or the option of winning the product or service by participating in the game aspect of the present invention discussed below. This aspect of the system is useful for persons desiring to purchase products or services from classified advertisements.

In a preferred embodiment of the invention, the user, after entering a specific URL address, may invoke the search engine to determine whether other third-party web-sites offer the desired product or service. If this is the case, the system collects and displays the price and other data in a dynamically generated Web page and the user proceeds as described above.

Auction Module Embodiment

According to another aspect of the present invention, users who participate in on-line auctions are provided the opportunity to win the product or service they are bidding on.

Using a web crawler or database replication, the system retrieves data from online auction systems, such as yahoo.com or ebay.com, and locates auctions that are about to close. The system stores the URLs for such auctions, revisits auctions after they have closed to determine the winners. The system sends an e-mail to each winner with a message and a hyperlink. The hyperlink is generated dynamically and includes an identifier of the bidder and the item that was being bid on. If the email recipient (the auction winner) clicks the hyperlink, the email recipient's browser causes the system to retrieve the auction information and present it in a dynamically generated web page from which the recipient can play a game in accordance with the game aspect of the invention described more fully below. If the auction winner plays and wins the game, the system reimburses the auction winner for the price of the auction item. In a preferred embodiment, a check for the reimbursement amount is mailed to the auction winner who wins the game.

Alternatively, users may subscribe to a "win your auction item watch" by supplying the system with their auction user name, e-mail address and an identifier of the auction site that they use. The system regularly monitors the auctions of users who subscribe, and solicits them via email to try and win items they have bid on by participating in the game aspect of the present invention.

Item Index Module

In another aspect of the present invention, the user can browse through an index of pre-selected items. The user can navigate through the system's index of pre-selected items by clicking on descriptive hyperlinks grouped by category. Upon selecting an item that the user desires, the product selection component 108 is invoked to search the product database 112 for third-party web sites which offer the desired item for sale. The results are displayed, and the user can opt to purchase the item or participate in the game aspect of the present invention in an attempt to win the item.

Figure 5:
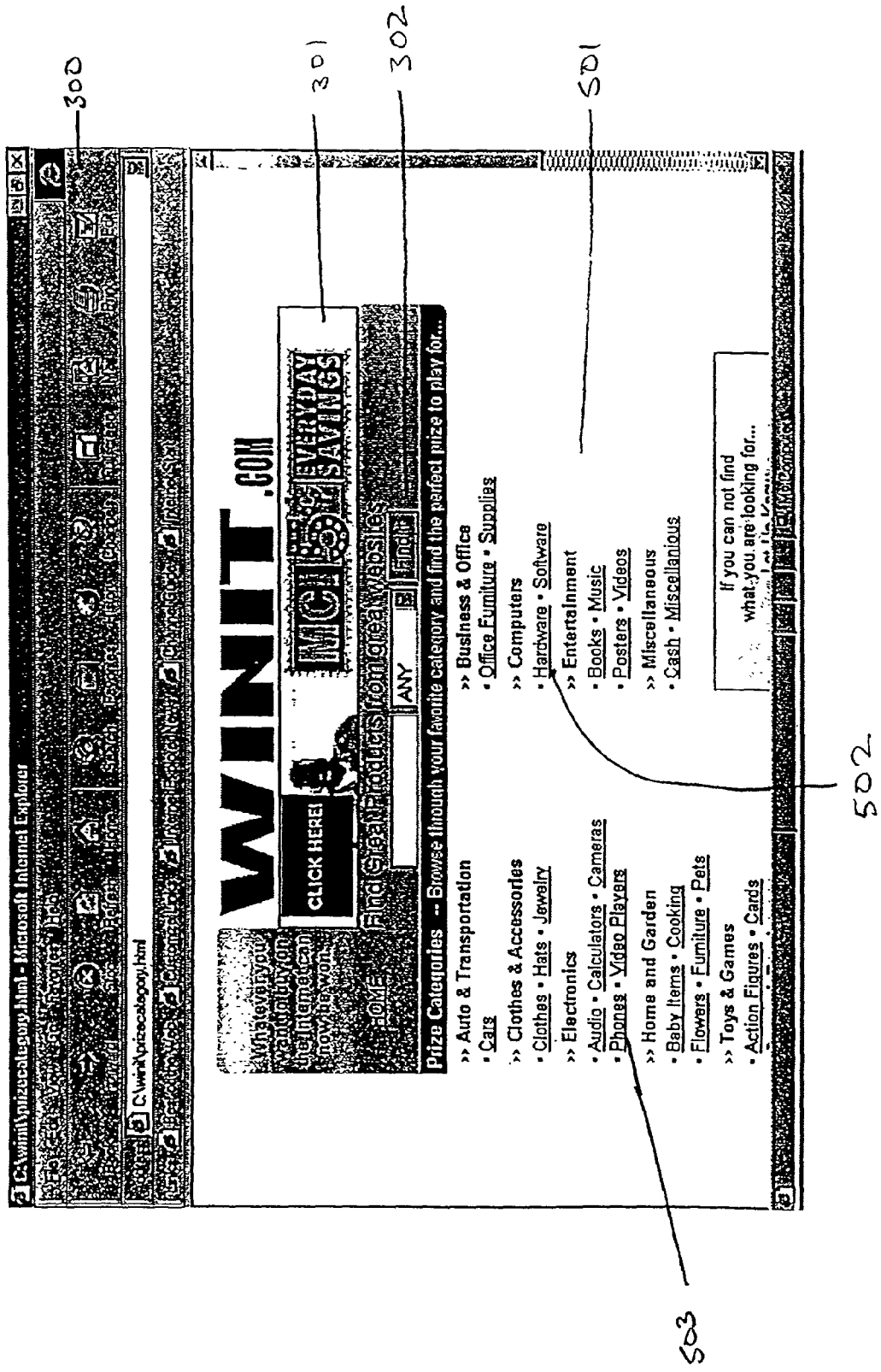
FIG. 5 illustrates an example display of an example preferred embodiment.
Figure 6:
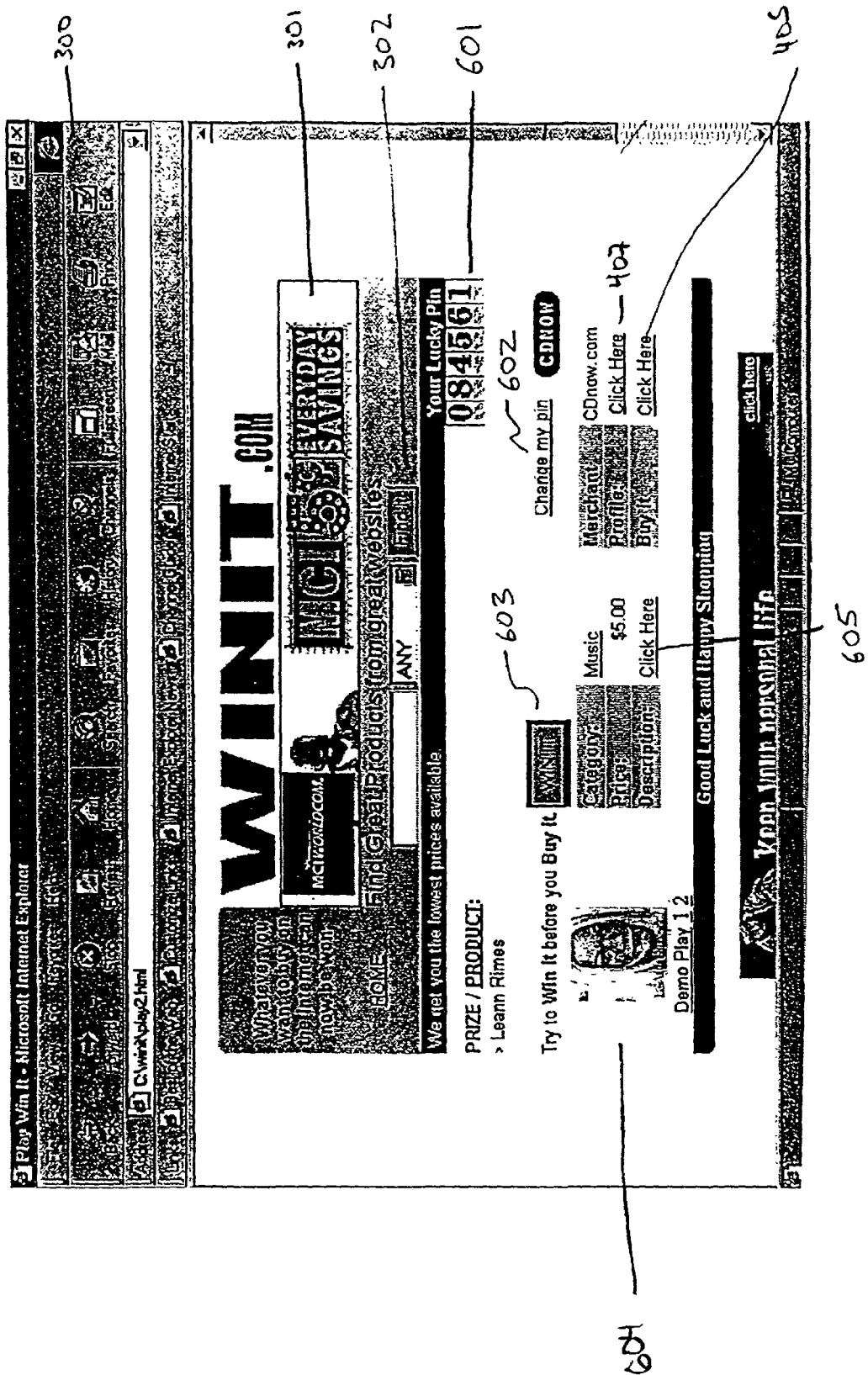
FIG. 6 illustrates an example display of an example preferred embodiment.

FIG. 5 depicts an item index Web page of a preferred embodiment of the present invention. The item index is arranged in a category index 501. In this example preferred embodiment, the user may obtain more information regarding the available items in the categories of computer hardware or phones by clicking on hyperlinks such as 502 and 503.

Search Results Display

After the user has determined an item to retrieve from the search engine by entering a query or browsing, the search results are displayed as illustrated for an example preferred embodiment in FIG. 4. Vendor descriptions for the item description are displayed 403, together with corresponding prices 410, and merchant identifiers 406. The user may acquire additional information about the vendor by accessing the vendor's profile stored on the system by selecting link 407. Additional information from the vendor concerning the item may be retrieved via the "more information" link 408.

The user may buy the item from the vendor by selecting the corresponding "Buy It" link 405. The hyperlink comprises a URL for a page on the vendor's web server from which the user may purchase the selected item. Thereafter the user follows the procedures set forth by the selected web site to purchase the desired product or service.

Figure 7:
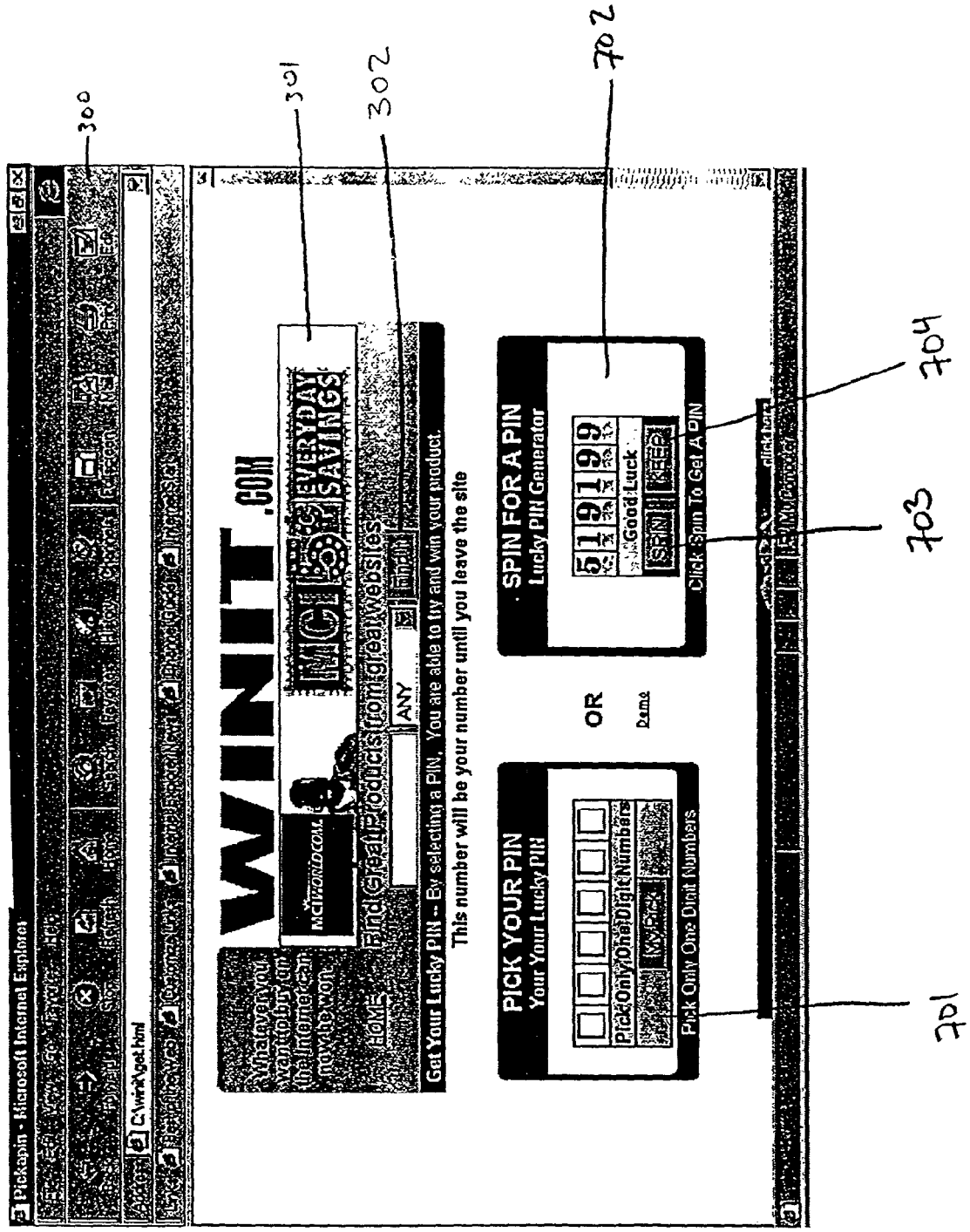
FIG. 7 illustrates an example display of an example preferred embodiment.

The user may instead opt to attempt to win the desired product or service by selecting the "Win It" button 404 displayed corresponding to the user's selected vendor for an item. When the "Win It" button is selected, the user session manager 109 system uses a cookie stored on the user's computer, or credentials based on the user's login to query the user database 113 to determine whether the user has a current PIN number. If the user does not have a current PIN number, the display illustrated in FIG. 7 is presented. The user may then enter a PIN using form 701, or randomly select a PIN using applet 702, which comprises a portion of the Jscript/Java game logic 106. Applet 702 causes the digits displayed therein to scroll past randomly in response to the "SPIN" button 703 and slow to a stop at a pseudo-randomly determined number. The user may select a new pseudo-random number by selecting the "SPIN" button 703 again, or select the pseudo-randomly generated PIN by selecting the "KEEP" button 704.

Figure 8:
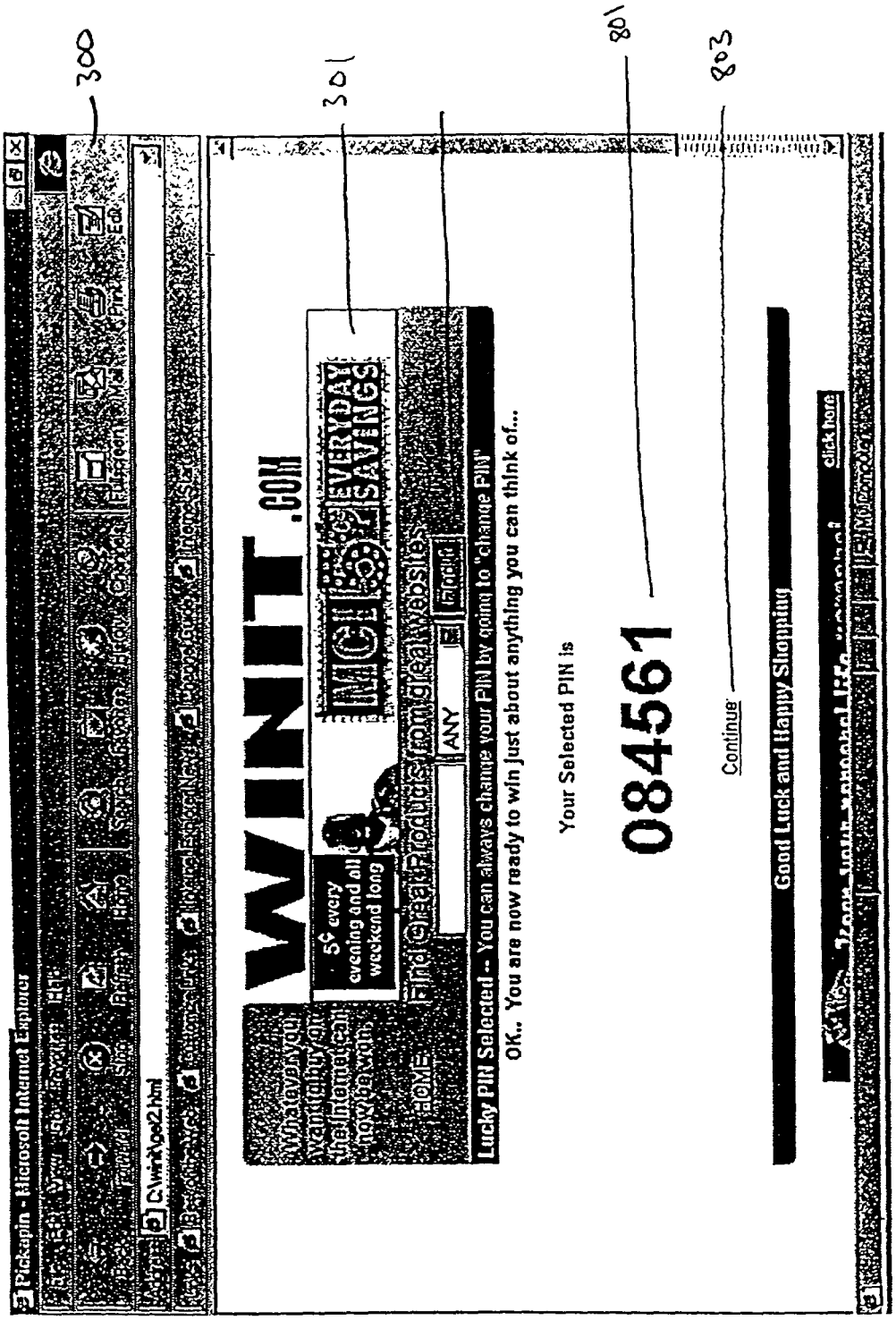
FIG. 8 illustrates an example display of an example preferred embodiment.

In response to the user selecting a PIN number using form 701 or applet 702, a selected-pin page similar in form to that illustrated in FIG. 8 is displayed, prominently displaying the user's selected PIN number 801. To continue playing, the user selects the "Continue" link 803.

Figure 12:
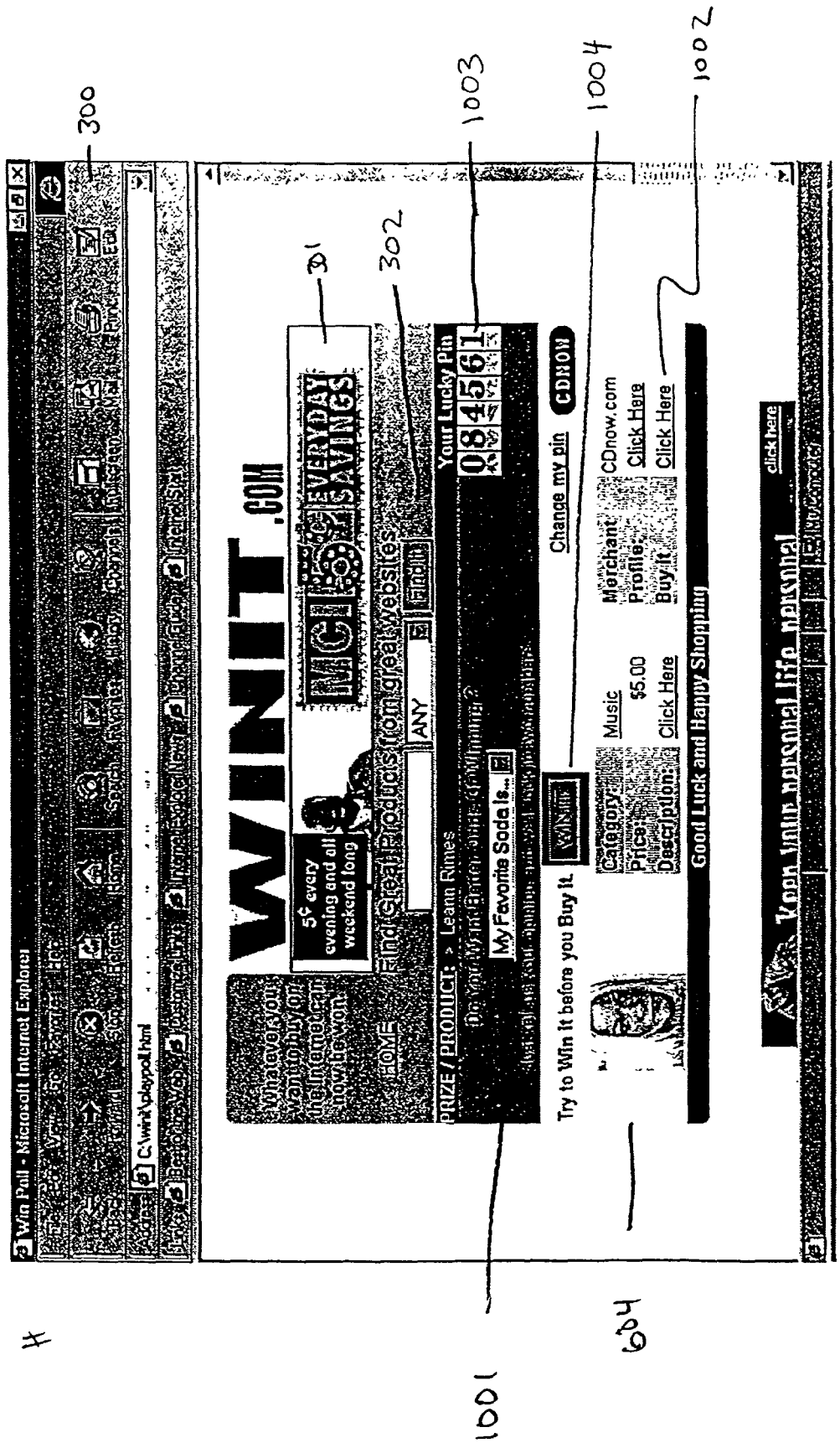
FIG. 12 illustrates an example display of an example preferred embodiment.

The display illustrated in FIG. 12 is presented in response to the "Continue" link 803, or in response to the "Win It" button if the system determined that the user had a current PIN number in response to the user selecting the "Win It" button 404. In FIG. 12, information describing the selected item and vendor is displayed, together with a link permitting the user to purchase the item from the vendor 1002. In addition, a "Win It" button 1004 is presented, permitting the user to invoke the odds management component 107 to cause a random trial to be performed. If the outcome of the trial is a win for the user, the odds management component 107 retrieves the user's shipping address from the user's profile in the user database 113 and the system purchases and pays for the item on behalf of the user.

Figure 9:
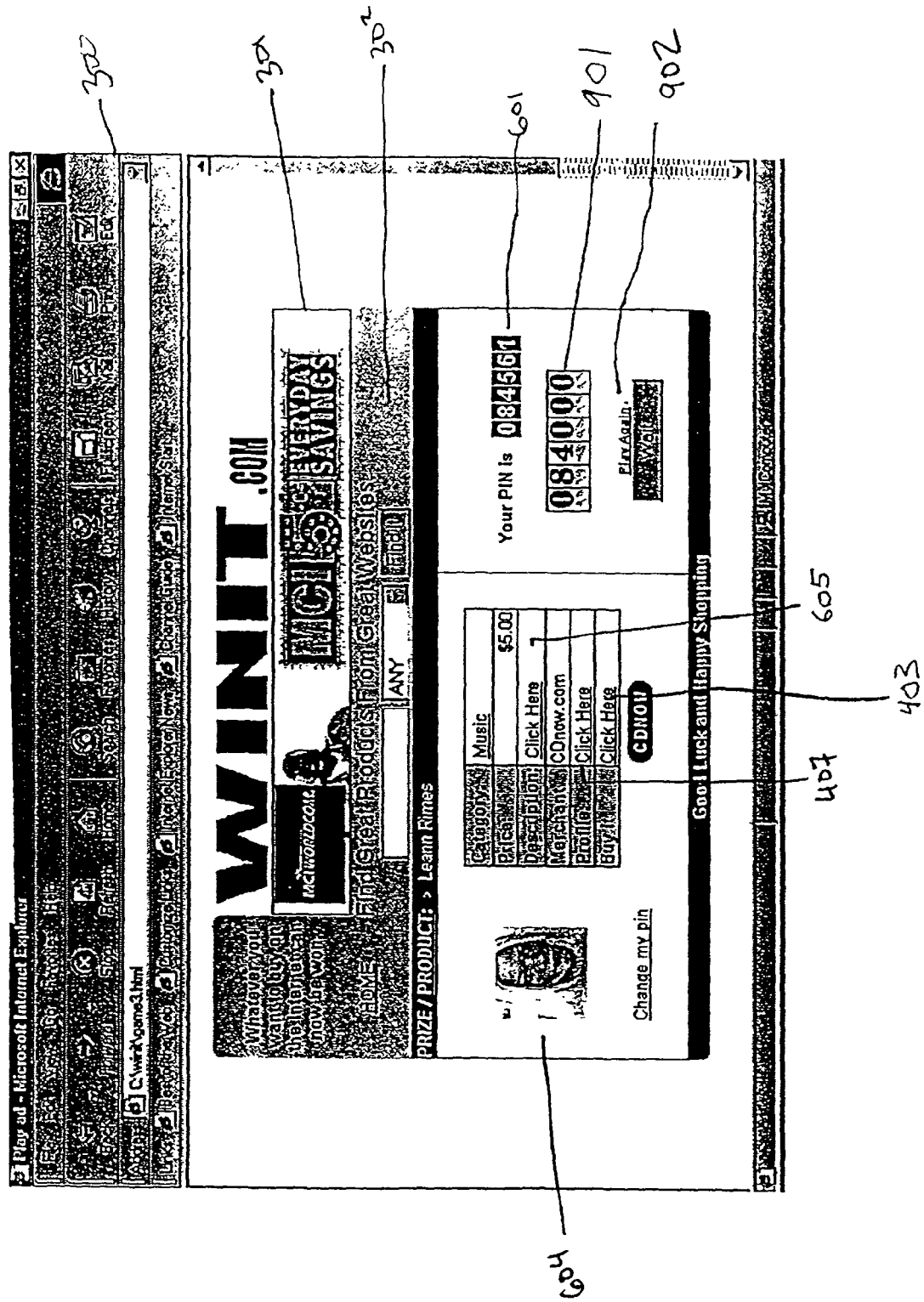
FIG. 9 illustrates an example display of an example preferred embodiment.

The results of the trial are provided to the user in a dynamically generated Web page illustrated in FIG. 9. If the outcome is a win for the user, the odds management component 107 causes the outcome number displayed in outcome applet 901 to match the user's PIN 601. If the outcome is a non-win, the outcome number displayed in outcome applet 901 will differ from the user's PIN 601 as shown in FIG. 9. In a preferred embodiment, the outcome applet causes the displayed numbers to scroll by pseudo-randomly until settling one digit at a time on the outcome number. The user may cause additional trials to be performed by selecting the "play again" link 902. After each trial, a display resembling FIG. 9 is displayed, along with updated outcome and advertising. Advertisers are charged for each advertisement display, resulting in additional revenue for the system for each trial. The odds management component tracks the revenue generated during a particular user session and uses the information to calculate the user's probability of winning as described below.

The odds management component 107 controls the probability of a user winning a desired product or service. A variety of probability models and rules may be applied by the odds management component 107 to determine the probability of winning. Preferably, the odds management component 107 is configured to determine an overall prize budget in real-time, and the user's probability of winning a desired product or service is varied by the odds management component 107 as a function of the ratio of the product or service's price to the current prize budget.

In this preferred embodiment, the odds management component 107 increases the prize budget in real time as revenue accrues to the site through advertising. As more users use the site, advertising revenue increases proportionately. Preferably, each advertisement displayed causes a fixed increment to the prize budget, so that the ratio of the prize budget to users remains approximately fixed as system use increases. Other sources of system revenue may also be allocated to the prize budget. The costs of awarded prizes are deducted from the prize budget, so that the probability of any particular user winning any particular item will fluctuate with time.

The odds management component 107 also preferably adjusts each user's probability of winning based on user's session history retrieved from the user database 113, including the number of numbers the user has "locked in" (as explained below) and the total advertising earnings derived from the user during this session. Preferably, the odds management component 107 calculates a probability of each user's winning a particular item so that the expected value of the user's estimated attempts to win during any period are less than or equal to the expected value of the user's contributions to the prize budget for the same period.

In one preferred embodiment, the odds management component 107 calculates the probability of winning for the user as $$\text{Probability of winning} = P = \frac{P_a * P_t * P_m}{N} + P_u$$

where

N is the number of users currently online.

$P_a$ is a probability factor that varies with the cost of the selected prize in relation to the total cost of all prizes available on the system, such that $P_a$ approaches zero as the cost of the selected prize approaches the total cost of all prizes, and $P_a$ approaches 1 as the cost of the selected prize approaches zero.

$P_t$ is a probability factor that varies with the total current prize budget, such that $P_t$ approaches zero as the cost of the selected prize approaches the maximum allowable prize amount, and $P_t$ approaches 1 as the cost of the selected prize approaches zero.

$P_m$ is a probability factor that varies with the ratio of the current prize budget to the total funds received by the system, such that $P_m$ approaches one as the current prize budget approaches the maximum income received by the system and $P_m$ approaches zero as the current prize budget approaches the maximum income received by the system minus the maximum allowable prize budget.

$P_u$ Is a probability factor that varies with the user's behavior within a session.

Preferably $$P_a = 1 - \frac{A_p}{\sum_{i=1}^{n} A_i} \quad \text{if } A_p < T*K \text{ and } P_a > W_{min}$$

$P_a = W_{min}$ otherwise
where
$A_p$ = cost of the selected prize
$A_i$ = cost of the $i^{th}$ prize
$\sum_{i=1}^{n} A_i$ = total cost of all prizes in database
$W_{min}$ = minimum probability of winning
and preferably $$P_t = \frac{T*K - A_p}{T*K} \quad \text{if } P_t > W_{min} \quad \text{where } A_p < T*K$$

and
$P_t = W_{min}$ otherwise
where
T = current prize budget
K = proportion of the current prize budget that may be awarded, 0<K<1
And where $$P_m = \frac{\frac{T}{T_m} + K - 1}{K} \quad \text{if } P_m > W_{min} \quad \text{where } T < T_m$$

and $P_m = W_{min}$ otherwise where
$T_m$=maximum prize budget to date.
And preferably
$P_u = P_{u_1} * P_{u_2} * P_{u_3}$
Where
$P_{u_1} = P_0 * (1-P_0)$ $$P_0 = \frac{P_a * P_t * P_m}{N}$$

$$P_{u_2} = \frac{N_{max} + N_{min} - N_c}{N_{max}}$$

$N_{max}$=maximum number of spinning digits
$N_{min}$=minimum number of spinning digits
$N_c$=current number of spinning digits
$P_{u_3} = 1 - e^{-E/A_p}$
where
E=the total advertising earnings derived from the user during this session.

When the Win-It button 1004 is selected, the Jscript/Java Game logic invokes the odds management component 107, which calculates a pseudo-random event trial having probability of returning true equal to the calculated probability of winning P. If the pseudo-random event trial returns true, the odds management component 107 causes a winning display to be presented to the user. Otherwise, the odds management component 107 causes a losing display to be displayed to the user.

The probability of winning is preferably independent of the outcome number and PIN. The outcome of the trial determines whether a winning display or a losing display is presented to the user. Preferably, a different outcome number is presented after each trial. Preferably, losing outcome numbers are selected using a pseudo-random number generator having an output distribution that is independent of and differently distributed from the pseudo-random outcomes used to perform random trials.

Before each trial, the user may be given an opportunity to increase their odds of winning. For example, the user may be asked to complete a brief consumer survey, visit an advertiser's web site, or voluntarily perform some other similar task for which the system is compensated by third-parties. A portion of this revenue is allocated to the to the prize budget, and the odds management component 107 increases the user's probability of winning in response. For example, the user may be presented with the opportunity to increase the user's odds of winning by completing a survey using survey interface.

Alternatively, or in addition, such opportunities are presented to the user at random intervals in response to the user's selection of the "play again" button 902. A first such opportunity is illustrated in FIG. 10. By selecting sponsor link 9102, the sponsor's web site is displayed in a frame in the user's browser. In return for directing the user to the sponsor's web site, the system receives revenue from the sponsor. A portion of the revenue received is allocated to the prize budget, and the odds management component 107 increases the user's probability of winning in response.

An increased probability of winning is reflected in the display by "locking in" a digit of the outcome number to match the user's PIN as shown in FIG. 11. The "locked in" status of digit 9301 is signified by a different background display color. The game may be played using the display shown in FIG. 11 as described above in connection with FIG. 10. However, outcome numbers are selected from a reduced range, and the "locked in" digit of the outcome number is not varied. As before, the user's probability of winning is preferably varied independently of the selection of outcome numbers. The "locked in" digit thus signifies that the user's probability of winning has increased, but not the magnitude of the increase. As a user's probability of winning increases, for example, through continued play, multiple digits may be "locked in" to signify the increased probability of winning.

In a preferred aspect of the present invention, the odds management component 107 may award an unsuccessful user a consolation prize. Preferably, the odds management component 107 determines to award a consolation prize based on the frequency of visits, participation in odds-increasing opportunities presented, and demographic information stored in the user's profile. The type of consolation prize may be selected based on preferences determined from the user's profile. Preferably, the odds management component 107 awards a consolation prize after threshold number of attempts to win has been exceeded and the user has generated more revenue for the system than the cost of the consolation prize and its associated expenses.

What is claimed:

1. A method of providing a user with a game of chance, the method comprising the steps of:
receiving electronic signals from a user system representing search parameters descriptive of a product;
retrieving at least one product information from at least one database storing independent third-party retail vendor product information;
transmitting electronic signals to the user system representing the retrieved product information and associated prices;
automatically providing the user with an option to play a game to win a selected product from said product information without the user first making any payment or requesting the option;
electronically calculating a dynamic probability of winning the selected product by the user based on one or more factors selected from a group consisting of: the cost of the selected product in relation to the total cost of all products available, a current prize budget, a ratio of the current prize budget to a total amount of funds received, and the user's behavior during a user session;
electronically and randomly generating a trial outcome of an event trial, the probability of the event trial generating a winning trial outcome corresponding to the calculated probability of winning;
generating an outcome indicator, wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution; and
displaying the outcome indicator to the user; and in response to a winning trial outcome, purchasing the selected product for the user from the independent third-party retail vendor at no cost to the user.

2. The method of claim 1, wherein the probability of winning on successive plays of the game increases with the value derived from the user's interaction with the system.

3. The method of claim 1, wherein the display comprises a user-chosen number and a comparison number, such that a winning outcome is indicated by displaying a comparison number that matches the user-chosen number, and a losing outcome is indicated by displaying a comparison number that does not match the user-chosen number.

4. The method of claim 3, wherein an increased probability of winning on successive plays of the game is indicated by displaying a comparison number having at least one digit matching the corresponding at least one digit of the user-selected number.

5. The method of claim 3, wherein the probability of winning is different than one divided by ten raised to the power of the number of digits in the comparison number.

6. The method of claim 1, comprising providing the user with an opportunity to increase the chances of winning by performing a task for which a third party provides compensation to the provider of the game of chance.

7. The method of claim 1, comprising calculating a probability of winning based on at least a current budget.

8. The method of claim 1, comprising calculating a probability P of winning based on a total number of game players.

9. The method of claim 1, comprising calculating a probability P of winning based on:

$$P = \frac{P_a * P_t * P_m}{N} + P_u$$

where:
$P_a$ is a probability factor that varies with the cost of the selected product in relation to the total cost of all products available;
Pt is a probability factor that varies with a current prize budget;
Pm is a probability factor that varies with a ratio of the current prize budget to a total amount of funds received;
Pu is probability factor that varies with the user's behavior during a user session; and
N is a number of current users.

10. The method of claim 1, further comprising collecting a database of independent third party retail vendor product information prior to receiving the search parameters from the user.

11. The method of claim 1 whereby transmitting electronic signal as representing product info and said automatically providing an option to play is by transmitting a webpage containing at least a link to a webpage of the independent third party retail vendor and a link to initiate playing to win the same product.

12. A method of providing a user with a game of chance, the method comprising:
receiving electronic signals from a user system representing at least one search parameter descriptive of a product;
retrieving at least one product information from at least one database storing independent third-party retail vendor product information;
transmitting electronic signals to the user system representing at a least one product, a price of the product and the independent third-party retail vendor of the product;
automatically transmitting electronic signals representing at least a first option for the user to play a game to win the product without the user first making any payment or requesting the first option, and a second option to purchase the product;
if the user chooses to play the game:
electronically calculating a dynamic probability of winning the product by the user based on one or more factors selected from a group consisting of: the cost of the selected product in relation to the total cost of all products available, a current prize budget, a ratio of the current prize budget to a total amount of funds received and the user's behavior during a user session;
electronically generating a trial outcome, the probability of the trial outcome generating a winning trial outcome corresponding to the calculated probability of winning;
generating an outcome indicator, wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution;
displaying the outcome indicator to the user; and
in response to a winning trial outcome, purchasing the product for the user from the independent third-party retail vendor at no cost to the user; and
if the user chooses to purchase the product instead of playing the game:
directing the user to a web site which sells the product.

13. The method of claim 12, comprising providing the user with an opportunity to increase the chances of winning on successive plays of the game by performing a task for which a third party provides compensation to the provider of the game of chance.

14. The method of claim 12, comprising calculating a probability P of winning based on a total number of game players.

15. The method of claim 12, comprising calculating a probability P of winning based on:

$$P = \frac{P_a * P_t * P_m}{N} + P_u$$

where:
Pa is a probability factor that varies with the cost of the selected product in relation to the total cost of all products available;
Pt is a probability factor that varies with a current prize budget;
Pm is a probability factor that varies with a ratio of the current prize budget to a total amount of funds received;
Pu is probability factor that varies with the user's behavior during a user session; and
N is a number of current users.

16. A method of providing a user with a game of chance, the method comprising:
receiving electronic signals from a user system representing at least one search parameter descriptive of a product;
retrieving at least one product information from at least one database storing independent third-party retail vendor product information;
transmitting electronic signals to the user system representing a plurality of different independent third-party retail vendors and associated prices charged by each of said different independent third-party retail vendors for products identified in response to said at least one search parameter;

automatically transmitting electronic signals to the user system representing an option to play a game to win a selected one of said products without the user first making any payment or requesting the option; and if the user chooses to play the game:

electronically calculating a dynamic probability of winning said selected one product by the user based on one or more factors selected from a group consisting of: the cost of the selected product in relation to the total cost of all products available, a current prize budget, a ratio of the current prize budget to a total amount of funds received and the user's behavior during a user session;

electronically generating a trial outcome, the probability of the trial outcome generating a winning trial outcome corresponding to the calculated probability of winning;

generating an outcome indicator, wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution;

displaying the outcome indicator to the user; and in response to a winning trial outcome, purchasing said selected one product from a corresponding independent third-party retail vendor for the user at no cost to the user.

17. The method of claim 16, comprising providing the user with an opportunity to increase the chances of winning by performing a task for which a third party provides compensation to the provider of the game of chance.

18. The method of claim 16, comprising calculating a probability P of winning based on a total number of game players.

19. The method of claim 16, comprising calculating a probability P of winning based on:

$$P = \frac{P_a * P_t * P_m}{N} + P_u$$

where:

Pa is a probability factor that varies with the cost of the selected product in relation to the total cost of all products available;

Pt is a probability factor that varies with a current prize budget;

Pm is a probability factor that varies with a ratio of the current prize budget to a total amount of funds received;

Pu is probability factor that varies with the user's behavior during a user session; and N is a number of current users.

20. The method of claim 16, wherein the electronic signals representing the associated prices charged by each of said different dealers, represent the prices charged on said each of said different dealers' own web sites.

21. A method of providing a user with a game of chance, the method comprising:

receiving electronic signals from a user system representing at least one search parameter descriptive of a product;

searching for products matching said at least one search parameter;

transmitting electronic signals to the user system representing a plurality of independent third-party retail vendors and associated prices charged by each of said independent third-party retail vendors for products identified in response to said at least one search parameter, each of the products identified being offered for sale on a corresponding web site of each independent third-party retail vendor;

automatically transmitting electronic signals to the user representing an option to play a game to win a selected one of said products without the user first making any payment or requesting the option; and if the user chooses to play the game:

electronically calculating a dynamic probability of winning said selected one product by the user based on one or more factors selected from a group consisting of: the cost of the selected product in relation to the total cost of all products available, a current prize budget, a ratio of the current prize budget to a total amount of funds received and the user's behavior during a user session;

electronically generating a trial outcome, the probability of the trial outcome generating a winning trial outcome corresponding to the calculated probability of winning;

generating an outcome indicator, wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution;

displaying the outcome indicator to the user; and in response to a winning trial outcome, purchasing said selected one product from a corresponding independent third-party retail vendor for the user at no cost to the user.

22. A method for providing a user an opportunity to win a product or service by playing a game of chance without buying the product or service and without paying a fee to play, comprising the steps of:

enabling the user to submit a search query associated with a type of product or service;

conducting a search in a database for an independent third-party retail vendor product or service that satisfies the search query;

automatically presenting a result of the search to the user, including at least one product or service offered for sale by the independent third-party retail vendor retrieved from the database, along with an option to play the game;

enabling the user to select the product or service that he wants to win;

dynamically determining the user's chance of winning the selected product or service based on one or more factors selected from a group consisting of: the cost of the selected product in relation to the total cost of all products available, a current prize budget, a ratio of the current prize budget to a total amount of funds received and the user's behavior during a user session;

generating a trial outcome for each play of the game wherein the probability of the trial outcome generating a winning trial outcome corresponds to the user's chance of winning;

generating an outcome indicator, wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution; and displaying the outcome indicator to the user.

23. The method for providing a user an opportunity to win a product or service of claim 22 further comprising the step of purchasing the selected product or service for the user, and at no cost to the user, if the outcome for the play of the game is a win.

24. The method for providing a user an opportunity to win a product or service of claim 22 further comprising the step of enabling the user to increase the chance of winning the selected product or service through repeated plays of the game.

25. The method for providing a user an opportunity to win a product or service of claim 22 wherein the step of determining the user's chance of winning the selected product or service is a function of at least one of a cost of the product or service, a number of other users playing to win the product or service concurrently, a current prize budget and an amount of funds received from an advertising sponsor.

26. The method for providing a user an opportunity to win a product or service of claim 25 wherein the advertising sponsor provides funds for the purchase of the selected product or service to a game provider as a payment for a display of an advertisement to the user during each play of the game.

27. The method for providing a user an opportunity to win a product or service of claim 26 wherein the user's repeated plays of the game generates revenue from the advertising sponsor paid to a game provider which increases the user's chance of winning the selected product or service.

28. The method for providing a user an opportunity to win a product or service of claim 25 wherein the step of determining the user's chance of winning the selected product or service is a function of the user's behavior during repeated plays of the game.

29. The method for providing a user an opportunity to win a product or service of claim 22 wherein the game of chance comprises displaying a number selected by the user along with the number generated to represent the outcome for each play of the game.

30. The method for providing a user an opportunity to win a product or service of claim 29 wherein the user can increase the probability of winning the product or service by participating in an online survey for an advertising sponsor.

31. A method for increasing user traffic to a search engine website, comprising:

receiving a search query from a user system interacting with a search webpage of the website, the search query defining a desired product for the user; and transmitting a results webpage to the user system, the results webpage including at least one link for redirection to an independent third party vendor website where the user system can interact with at least one webpage to purchase a corresponding product and further including in the same webpage a play link corresponding to the independent third party vendor link for redirection to a webpage which allows the user to play a game of chance to win the product at no cost to the user, the link corresponding to the independent third party website redirection link;

electronically calculating a dynamic probability of winning the corresponding product by the user;

electronically and randomly generating a trial outcome of an event trial, the probability of the event trial generating a winning trial outcome corresponding to a determined probability of winning;

generating an outcome indicator wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution;

displaying the outcome indicator to the user; and in response to a winning trial outcome, purchasing the selected product for the user from the independent third-party retail vendor at no cost to the user.

32. The method of claim 31, wherein said play link webpage is provided by the search engine website and wherein the search engine website calculates the outcome of the game of chance for a user system selecting to play to win the product and further wherein if the user outcome is favorable the search engine website facilitating the purchase of the product from the independent third party vendor corresponding to the independent third party website redirection link.

33. A method for increasing user traffic to a search website, comprising:

providing a search webpage containing a search interface for a user to submit a search query for a product;

receiving a search query from a user employing said search webpage;

searching independent third party websites by reference to said query;

retrieving product information and corresponding price from the independent third party websites for at least one products satisfying said query;

providing a game of chance in response to a user selection of the link to win the product;

purchasing the product from the independent third party for the user response to a favorable outcome in said game;

transmitting at least one results webpage to the user, the results webpage including at least one link for the product information, a corresponding price, a link to the independent third party website, and a link to win the product;

providing a game of chance in response to a user selection of the link to win the product, wherein the probability of winning the product by the user is dynamically calculated based on one or more factors selected from a group consisting of: the cost of the selected product in relation to the total cost of all products available, a current prize budget, a ratio of the current prize budget to a total amount of funds received and the user's behavior during a user session;

generating an outcome indicator, wherein the outcome indicator is generated independently of the probability of winning, and wherein the outcome indicator is representative of a winning trial outcome or a losing trial outcome, and further wherein the outcome indicator for a winning trial outcome has a distribution associated with a first statistical distribution and the probability of winning has a distribution associated with a second statistical distribution, and further wherein the first statistical distribution has a distribution which is different from the second statistical distribution;

displaying the outcome indicator to the user; and purchasing the product from the independent third party for the user in response to a favorable outcome in said game and providing said product to the user at no cost to the user.

34. A product search website executing on a server storing a plurality of web pages, the website compromising:

a search page for a user submitting a query to the server for at least one product;

a results webpage transmitted to the user, the results page including links to an independent third party website and a link to a play webpage of the website;

a play webpage providing a game of chance for winning the at least one product corresponding to a selected play link from the results webpage, wherein a probability of winning the at least one product by the user is dynamically calculated based on one or more factors selected from a group consisting of: the cost of the selected product in relation to the total cost of all products available, a current prize budget, a ratio of the current prize budget to a total amount of funds received and the user's behavior during a user session; and a product win webpage to display an outcome indicator indicating a favorable outcome in said game of chance for the at least one product, wherein the outcome indicator is generated independently of the probability of winning, and wherein the outcome indicator is representative of a winning trial outcome or a losing trial outcome, and further wherein the outcome indicator for a favorable outcome has a distribution associated with a first statistical distribution and the probability of winning has a distribution associated with a second statistical distribution, and further wherein the first statistical distribution has a distribution which is different from the second statistical distribution.

35. A computer-implemented method, comprising the steps of:

receiving a search request for a product, wherein the search request is transmitted from a communication device associated with or used by a user;

processing the search request with a processing device;

generating a message, wherein the message contains information regarding at least one product offered by a retail vendor, product information regarding the at least one product, and at least one price associated with the at least one product;

transmitting the message to the communication device;

automatically providing the user with an option to play a game to win a selected product from the product information regarding the at least one product without the user first making any payment or requesting the option;

electronically calculating a dynamic probability of winning the selected product by the user based on one or more factors selected from a group consisting of: the cost of the selected product in relation to the total cost of all products available, a current prize budget, a ratio of the current prize budget to a total amount of funds received, and the user's behavior during a user session;

electronically and randomly generating a trial outcome for a game of chance, wherein the probability of the game of chance generating a winning trial outcome corresponds to the calculated probability of winning;

generating an outcome indicator, wherein the outcome indicator is generated independently of the trial outcome, and wherein the outcome indicator is representative of a winning trial outcome or a losing trial outcome, and further wherein the outcome indicator for a winning trial outcome has a distribution associated with a first statistical distribution and the trial outcome has a distribution associated with a second statistical distribution, and further wherein the first statistical distribution has a distribution which is different from the second statistical distribution;

displaying the outcome indicator to the user; and in response to a winning trial outcome, purchasing the selected product for the user from the independent third-party retail vendor at no cost to the user.

* * * * *